United States Patent [19]

de Boer et al.

[11] Patent Number: 5,518,751

[45] Date of Patent: May 21, 1996

[54] PROCESS FOR THE PREPARATION OF MILK CONCENTRATES AND MILK POWDERS HAVING A LONG STORAGE LIFE

[75] Inventors: Cor de Boer; Ellert Camminga, both of Leeuwarden; Cornelis Glas, Tietjerk; Rienk Weerstra, Leeuwarden, all of Netherlands

[73] Assignee: Friesland Brands B.V., Netherlands

[21] Appl. No.: 302,176

[22] Filed: Sep. 8, 1994

[51] Int. Cl.[6] .................................................. A23C 9/00
[52] U.S. Cl. ........................... 426/585; 426/580; 426/587; 426/491; 426/492
[58] Field of Search .................................. 426/585, 444, 426/445, 465, 490, 491, 492, 520, 580, 585, 586, 587, 588

[56] References Cited

U.S. PATENT DOCUMENTS

| | | |
|---|---|---|
| 1,432,633 | 10/1922 | Stevens . |
| 1,786,559 | 12/1930 | Born ........................................ 426/585 |
| 2,769,489 | 11/1956 | Eckstrom . |

FOREIGN PATENT DOCUMENTS

| | | |
|---|---|---|
| 0404058 | 12/1990 | European Pat. Off. . |
| 0476719 | 8/1915 | France . |
| 1180286 | 9/1959 | France . |
| 2522935 | 9/1983 | France . |
| 1196255 | 8/1989 | Japan ..................................... 426/585 |
| 2154121 | 9/1985 | United Kingdom .................... 426/585 |

OTHER PUBLICATIONS

Database WPI Week 8750, 1987 Derwent Publications Ltd., London, GB: AN 87–354084 & SU,A,1 308 309 (AS UKR Themophys) 7 May 1987.

Primary Examiner—Leslie Wong

[57] ABSTRACT

The invention relates to a process for the preparation of milk and milk powders having a long storage life utilizing techniques which are known per se. To that end, a milk liquid is prepared, which is evaporated, and a fat fraction is added to the milk liquid in one or more effects of the evaporator. This process is particularly suitable for the preparation of a milk having a long storage life, in which unsaturated fatty acid chains are present.

15 Claims, 1 Drawing Sheet

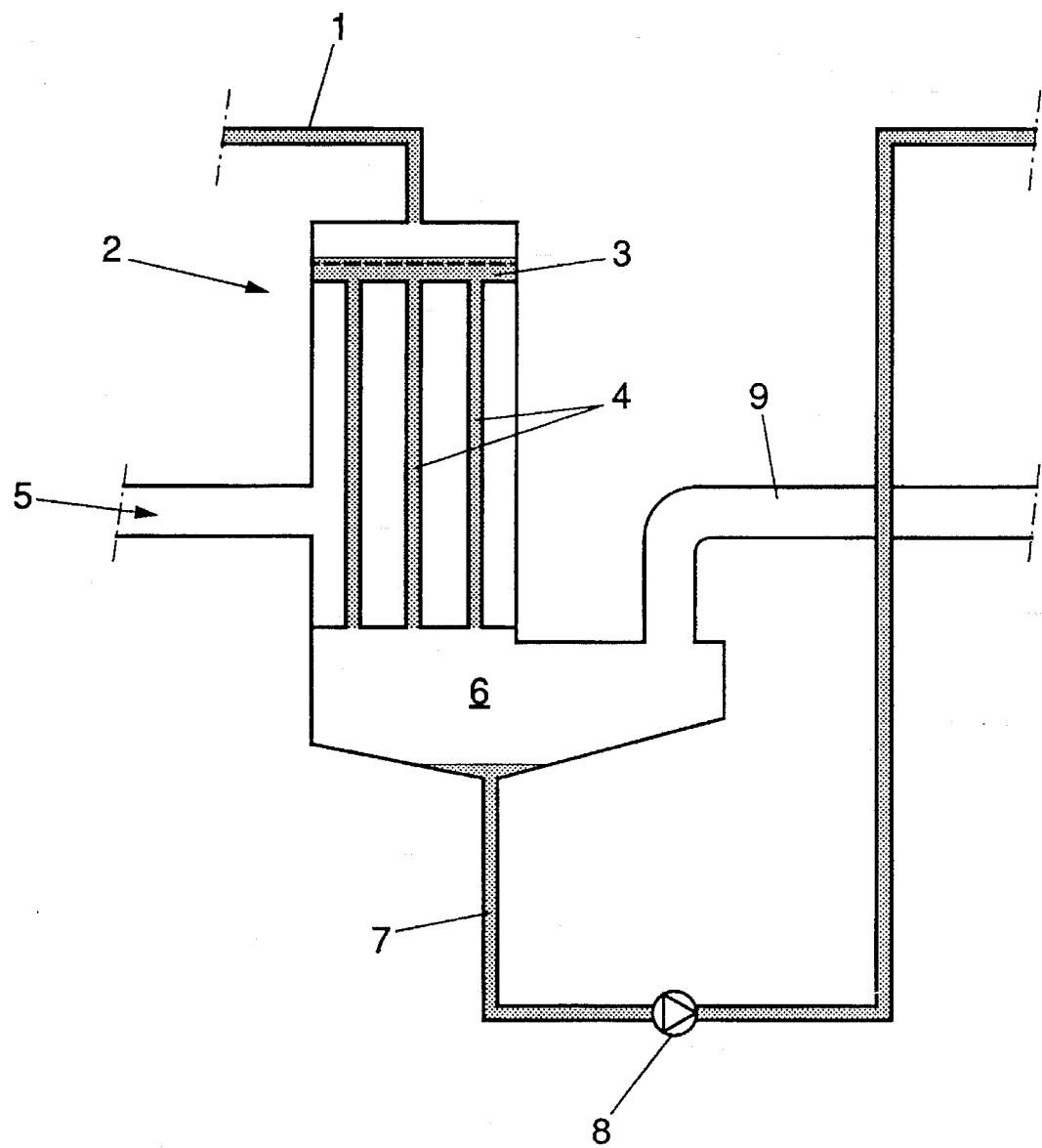

PROCESS FOR THE PREPARATION OF MILK CONCENTRATES AND MILK POWDERS HAVING A LONG STORAGE LIFE

BACKGROUND OF THE INVENTION

The present invention relates to a process for the preparation of milk concentrates and milk powders having a long storage life utilizing techniques which are known per se.

By bringing milk into a concentrated form or into a powder form and subjecting it to one or more heat treatments and to an aseptic packaging method, not only its storage life is prolonged but also the cost of transport is limited. For use, the concentrated or powdered milk product can be recombined or reconstituted.

In the case where in particular unsaturated fatty acid-containing compounds are present, however, the process of fat decay or 'turning rancid' develops relatively easily and rapidly with milk concentrates and milk powders. This process of turning rancid gives rise to deteriation of the taste and problems of uptake and easily leads to problems of indigestion, in particular in sensitive individuals. More particularly, this problem occurs with milk products which have been enriched with unsaturated fatty acid derivatives or in which the milk fat has been replaced completely with these derivatives. Examples of such unsaturated fatty acid derivatives include fats, phospholipids or emulsifiers which contain a high percentage of unsaturated fatty acids and/or strongly unsaturated fatty acids. Enrichment of milk and milk powders with unsaturated fatty acid-containing phospholipids or emulsifiers is done for technological or physiological reasons.

An important reason for enriching milk or milk powders with fats containing a high percentage of unsaturated fatty acids or strongly unsaturated fatty acids is to prevent or reduce cardiovascular diseases, atopies, rheumatic disorders or diabetes. In particular, such products contain a high percentage of oleic acid, linoleic acid which may or may not be conjugated, α-linolenic acid and unsaturated $C_{20}$ and $C_{22}$ fatty acids.

Thus, to prepare food for premature children the fat fraction of milk concentrates or milk powders is enriched with strongly unsaturated fatty acids of the type $C_{20}\omega-6$ and $C_{22}\omega-6 + C_{20}\omega-3$ and $C_{22}\omega-3$. These fatty acids are typically denoted by the name of LC-PUFAS, which is an abbreviation of "Long Chain poly-Unsaturated Fatty Acids". Examples of LC-PUFAS include: $C_{18}:3\omega6$ (γ-linolenic acid; GLA), $C_{20}:3\omega6$ (dihomo-γ-linolenic acid), $C_{20}:4\omega6$ (arachidonic acid; AA), $C_{18}:4\omega3$ (octadecatetraenoic acid), $C_{20}:5\omega3$ (eicosapentaenoic acid; EPA), $C_{22}:6\omega3$ (docosahexaenoic acid; DHA or DCHA).

LC-PUFAS are preferably included in the fat fraction of food for premature children together with the biochemical precursors $C_{18}:2\omega6$ (linoleic acid) and $C_{18}:3\omega3$ (α-linolenic acid). The reason for this is that the biochemical conversion of the precursors by desaturase and elongase enzymes proceeds only suboptimally in premature infants. LC-PUFAS, such as GLA, AA, EPA and DHA, are incorporated in particular in the fat fraction of food for premature infants because these fatty acids are of importance for optimum structuring of the cell membranes.

Biochemical conversions may also proceed suboptimally in non-premature infants. This is in particular a medically recognized problem with the conversion of linoleic acid to γ-linolenic acid (GLA) in elderly people. The fat fraction of milk or milk powders is then enriched with unsaturated fatty acids of the type GLA.

From the prior art, for instance European patent application 0 404 058, it is known to avoid the problem of unsaturated fatty acid-containing products turning rancid by adding to them antioxidants, such as α-tocopherol, optionally together with an emulsifier, such as lecithin, and/or by gassing these products with, for instance, nitrogen gas and/or carbonic acid gas and subsequently storing them under this inert gas.

SUMMARY OF THE INVENTION

According to the invention, an improved method has now been found for preventing unsaturated fatty acid-containing products turning rancid. When a fat fraction containing strongly unsaturated fatty acids with an unstable character is added to the milk liquid to be concentrated only on one of the effects of the evaporator instead of being mixed with the milk liquid prior to the start of the evaporation step, the concentrated or powdered product acquires an improved storage stability.

The process for the preparation of milk concentrates and milk powders having a long storage life by conventional techniques whereby a milk liquid is prepared which is minimally evaporated with an evaporator, is characterized according to the invention in that a fat fraction containing unsaturated (free) fatty acids is added to the milk liquid in one or more effects, or stages, of the evaporator.

Concentrated milk and milk powder obtained by the use of the process according to the invention have a prolonged storage life.

In accordance with the invention the fat to be added is metered during the evaporation in one or more of the effects of the evaporator. All this also simplifies the conduct of the process because less liquid needs to traverse the complete course of the evaporator and mixing capacity can be saved on. This is a second advantage of the process according to the invention.

Because of the last-mentioned advantage it is most advantageous to add the fat under the downpipes for the liquid collector of the last effect of the evaporator. However, the addition can take place in the way indicated in any effect of the evaporator.

U.S. Pat. No. 1,432,633 discloses an obsolete process for the preparation of a milk product which is composed of milk from which substantially all of the butter fat has been removed, and vegetable oils which are free of free fatty acids. The objective underlying this old patent is to provide a milk product of excellent flavor, the fat fraction being constituted by relatively inexpensive vegetable fat. The relatively costly animal fat can thus be made available for other uses. The milk product described can be partially condensed. Such partial condensation occurs discontinuously using a vacuum pan. After this step the fat fraction is added, followed by further condensation.

Similarly, French patent specification 476,719 discloses an obsolete process where a fat fraction is added to partially condensed low-fat or creamed milk. As in U.S. Pat. No. 1,432,633, use is made of a vacuum pan. This discontinuous process is used, according to the French publication, to facilitate the obtainment of an emulsion. The maximum temperature in the emulsifying process described is 54° C.

In the process according to the invention, different fats and/or emulsifiers or emulsifier-containing compositions, such as phopholipid-containing compositions, buttermilk or butter serum, can be added to the same or different effects of the evaporator. The addition can take place before, in or after the liquid collector of an effect.

It is a further advantage of the process according to the invention that fatty acids which, for the purpose of certain uses, should occur in the fat fraction in very low percentages (0.05–0.5%) and in exact proportions, such as GLA, AA, EPA, DHA in the food of the premature child, are permanently present in the food in accurate amounts and proportions.

Another advantage of the process according to the invention is manifest in the case where powders are prepared. Milk powder which has been prepared in accordance with the present invention is less susceptible to fat decay during operations taking place before packaging under nitrogenous and/or carbon dioxide atmospheres, such as mixing with other ingredients or bacteriological checks.

The milk fluid which is the starting material of the process according to the invention and to which the 'unsaturated' fat is added in one or more effects of the evaporator, may or may not be obtained through recombination of milk raw materials and optional additives.

Thus, suitable milk liquids can be composed from whole milk (powder), partially creamed milk (powder), skim milk (powder), buttermilk (powder), butter serum, whey (powder), desalted whey (powder), derivatives recovered from whey—for instance lactose; hydrolyzed lactose; whey protein; whey protein fractions; galactoligosaccharides; and milk sugar-low whey powder—casein, glycomacropeptide-free casein, protein hydrolysates, and combinations of these raw materials. Optionally, it is possible to add, as additives, milk-foreign protein and/or carbohydrate sources, vitamins, minerals that are not prooxidative, nucleotides, nucleosides, aromatic, flavoring and coloring substances, amino acids and stabilizers After, optionally, a preheating step and/or a homogenization step has been carried out, the milk liquid, after being prepared, is fed to the evaporator. During the evaporation process the fat fraction is added in one or more effects of the evaporator. Next, known process steps, such as homogenization, pasteurization, sterilization or spray-drying take place. If a concentrated liquid product is prepared, this is subsequently packaged in appropriate amounts in bottles, cans or other containers. In the case where the intended product is powdered, packaging takes place in containers, typically utilizing liquid nitrogen and/or carbon dioxide.

The fat fraction which is fed into one or more effects of the evaporator, for instance by spraying, may contain fats such as fish oil, egg yolk fat, liver fat, evening primrose oil, algae oil, soya oil, corn oil, sunflower oil, groundnut oil, butter oil, lard, olive oil and fractions or mixtures thereof.

Further, emulsifiers or emulsifier-containing liquids, such as buttermilk or butter serum which contain many phospholipids, can be sprayed in one or more effects of the evaporator.

Optionally, in addition, antioxidants, for instance ascorbyl palmitate, butylhydroxytoluene (BHT), vitamin E, ($\alpha$-tocopherol), $\beta$-carotene, and lecithin can be added.

The present invention will now be further elucidated with reference to the drawing and in and by the following examples.

BRIEF DESCRIPTION OF THE DRAWING

The drawing shows an effect of a multiple-effect evaporator.

DETAILED DESCRIPTION OF THE INVENTION

The milk liquid to be evaporated is introduced via pipe 1 into effect 2. Upon leaving pipe 1, the milk liquid is equally distributed by divider plates 3 over the downpipes 4. The milk liquid forms a film over the walls of these downpipes 4, which are heated externally with water vapor introduced via pipe 5. A two-phase flow of concentrate and vapor enter liquid collector 6, where product and vapor are separated. The product is pumped through pipe 7 and pump 8 to the divider plate of the next effect. The vapor is directed via line 9 to the next effect to condense on the outside of the downpipes. In the process according to the invention, a fat fraction can be supplied under the downpipes 4 or to the product flow in pipe 7.

EXAMPLE 1 Powdered food Product for premature children 1628 kg liquid containing 81 kg skim milk solids, 24.5 kg whey protein solids obtained through ultrafiltration, and 188 kg desalted whey solids, was divided in 2 portions A and B of 814 kg each. The solids content of this liquid was 18%.

To portion A (comparative example), 83 kg liquid fat (stored under nitrogen) was added with mixing at 50° C. This fat had the composition as shown in column C of Table I.

This fat-enriched liquid was subsequently evaporated to a solids content of 46% in an evaporator with three effects.

Portion B (invention) was evaporated to the extent where a product flow of a solids content of 35% was fed into the last effect of the evaporator. Under the downpipes of this last effect, 83 kg of the above fat composition was added to the liquid in a constant flow at 50° C., in such a manner that the fat was evenly distributed during the evaporation time that likewise a liquid of a solids content of 46% was obtained.

Both portions were subsequently homogenized in a two-stage homogenizer (100+30 bar), followed by cooling to 8° C. and the addition, with mixing, to the liquid of a number of additives which are conventional for food for premature infants: minerals, except for copper and iron, vitamins, amino acids, taurine, uridine monophosphate, guanosine monophosphate, inosine monophosphate, cytidine monophosphate, adenosine monophosphate.

Then both portions were spray-dried (inlet temperature 186° C., outlet temperature 90° C.) and a conventional premix (containing iron and copper) was admixed to form the desired end product. This product was packaged in cans, under nitrogen or not.

From a determination of the peroxide numbers of the fat fraction the powders of batch B possessed a higher stability than the powders of batch A over a storage period of 13 and 26 weeks, respectively. The peroxide numbers of the fat fraction were determined according to a modification of the method of Loftus Hills and Thiel (Loftus Hills, G. and Thiel C. C., J. Dairy Res. 14 (1946), 340; Australian Standard N 63, (1968), p 22). According to this method, the fat is extracted from the powder at 55° C. with a mixture of 1-chlorobutane/methanol, whereafter the peroxides present in the extract oxidize Fe(II) ions which have been added with a reagent, to form Fe(III) ions, whereafter the latter ions are determined spectrophotometrically by means of an ammonium rhodanide stain. The Table below presents the results of this peroxide number determination.

|  | Peroxide number of the fat (meq/kg) in 20 samples Storage period at 20° C.: | |
|---|---|---|
|  | 13 weeks | 26 weeks |
| Batch A, not packaged under $N_2$ | 0.7 | 1.4 |
| Batch B, not packaged under $N_2$ | 0.02 | 0.6 |
| Batch A, packaged under $N_2$ | 0.3 | 1.4 |
| Batch B, packaged under $N_2$ | 0 | 0.7 |

A comparable conclusion could be drawn from tests where the fat fraction was enriched with additional antioxidant (dose 200 ppm ascorbyl palmitate on the fat, and 1000 ppm Ronoxan A® containing 25% ascorbyl palmitate, 5% dl-α-tocopherol and 70% lecithin), whether or not combined with bringing the powder under nitrogen gas directly after drying.

The addition of fat in the last effect of the evaporator led to an improved and optimum result in terms of product stability.

Comparative Example 2 Evaporated milk ("Evap")

In accordance with a known method (C), 62 kg soya oil was added with vigorous stirring to a mixture of 390 kg whole milk, 1496 kg low-fat milk, and 107 kg butter serum. This mixture was heated up by known techniques, heated at 120° C. for three minutes and evaporated to 7.8% fat and 18% non-fat milk solids (nfms). This product was subsequently homogenized (150+ 25 bar, 50° C.).

This was followed by final standardization to 7.8% fat and 18% nfms with either water, or different amounts of solutions of $Na_2HPO_4$ and/or $NaH_2PO_4$ supplemented with water. This was followed by packaging in cans and sterilization at 121° C.

EXAMPLE 2 Evaporated milk ("Evap")

In accordance with the process of the present invention (D), 390 kg whole milk (4.38% fat and 8.85% nfms) was mixed with 1496 kg skim milk (0.03% fat and 9.24% nfms) and 107 kg butter serum (0.53% fat and 8.44% nfms). This mixed milk was heated to 120° C. by known techniques, followed by sustained heating for 3 minutes. The hot milk was then transferred onto the first effect of a falling film evaporator (two effects) and evaporated to a solids content of approximately 21%. Under the downpipes of the second effect, 62 kg soya oil of 50° C., evenly distributed over the entire required evaporation time, was added in a constant flow. Thus a product with 7.8% fat and 18% nfms was obtained. This evap was subsequently homogenized in the conventional manner (150+25 bar, 50° C.) and standardized either with water or with a solution of $Na_2HPO_4$ and/or $NaH_2PO_4$ in water. Finally, the evap was sterilized in cans, as described with reference to the traditional method (C).

EXAMPLE 3

Concentrated milk was produced as in Example 2, except that the butter serum was not mixed with the other milk liquids before evaporation but, after heating to 50° C., was injected into the second effect of the evaporator right beside the soya oil. The evap could be sterilized without addition of phosphates or other milk-foreign stabilizers.

EXAMPLE 4

Concentrated milk was prepared as in Example 3, but the soya oil was replaced with an oil containing 81% oleic acid (see oil B, Table I).

EXAMPLE 5

Concentrated milk was prepared as in Example 3, but the soya oil was replaced by fatty mixture C, as indicated in Table I.

According to the process of the present invention such as it has been illustrated in the Examples, oxidation-sensitive fatty acids enter into contact with oxygen to a minimal extent as compared with the process according to the comparative example. As a result, remarkably stable milk concentrates having a prolonged storage life are obtained by a simpler process operation.

TABLE I

| Fatty acid % | Soya oil | Oil B | Fat mixture C |
|---|---|---|---|
| C8:0 |  |  | 1.1 |
| C10:0 |  |  | 1.1 |
| C12:0 |  |  | 12.6 |
| C14:0 |  |  | 4.6 |
| C15 (a)iso |  |  |  |
| C15: |  |  |  |
| C16 (a)iso |  |  |  |
| C16:0 | 10.5 | 3.5 | 20.7 |
| C16:1ω7 |  |  |  |
| C17 anteiso |  |  |  |
| C17 iso |  |  |  |
| C17:0 |  |  |  |
| C17:1ω9 |  |  |  |
| C18:0 | 4.0 | 4.0 | 3.1 |
| C18:1ω9 | 22 | 81 | 36.5 |
| C18:1ω7 |  |  | 0.1 |
| C18:2ω6 | 54.5 | 9.0 | 15.80 |
| C18:3ω6GLA |  |  | 0.35 |
| C18:3ω3 | 7.5 |  | 1.9 |
| C18:4 |  |  | 0.05 |
| C20:0 | 0.5 | 0.5 |  |
| C20:1ω9 |  |  |  |
| C20:1ω7 |  |  |  |
| C20:2ω6 |  |  |  |
| C20:3ω6 |  |  |  |
| C20:3ω3 |  |  |  |
| C20:4ω6 AA |  |  |  |
| C20:5ω3 EPA |  |  | 0.25 |
| C22:0 | 0.5 | 1.0 |  |
| C22:1ω9/11 |  |  |  |
| C22:2ω6 |  |  |  |
| C22:4ω6 |  |  |  |
| C22:5ω3 |  |  |  |
| C22:6ω3 DHA |  |  | 0.35 |
| C24:0 |  |  |  |
| C24:1ω9 |  |  |  |
| other | 0.5 | 1.0 | 1.50 |

We claim:

1. A continuous process for the preparation of milk and milk powders having a long storage life, comprising the steps of:

(a) preparing a milk liquid, (b) feeding the prepared milk liquid into an evaporator having at least one stage, and then (c) adding a fat fraction containing unsaturated fatty acids to the milk liquid in at least one stage of the evaporator, downstream form step (b), in a constant flow such that the fat fraction is evenly distributed over the entire evaporation time.

2. A process according to claim 1, wherein the unsaturated fatty acids-containing fat fraction comprises fats rich in oleic acid, linoleic acid and linolenic acid.

3. A process according to claim 1, wherein the unsaturated fatty acids-containing fat fraction comprises fats containing $C_{20}$–$C_{22}$ ω6, $C_{20}$–$C_{22}$ ω3 fatty acids and mixtures thereof.

4. A process according to claim 1, wherein the unsaturated fatty acids-containing fat fraction comprises fats containing $C_{18}$:3 ω6 fatty acids (γ-linolenic acid).

5. A process according to claim 1, wherein the fat fraction comprises a fat chosen from one or more of, in combination, fats rich in oleic acid, linoleic acid and linolenic acid; fats containing $C_{20-22}$ ω6 and $C_{20-22}$ ω3 fatty acid; and fats containing $C_{18}$:3 ω6 fatty acids.

6. A process according to claim 1, wherein emulsifiers or emulsifier-containing liquids are added on one or more effects of the evaporator.

7. A process according to claim 6, wherein, as emulsifier-containing liquid, one of butter serum and buttermilk is added.

8. A process according to claim 1, wherein a thickened milk liquid is prepared.

9. A process according to claim 8, wherein before evaporation a preheating at 80°–150° C. occurs and after evaporation further homogenization and sterilization occur.

10. A process according to claim 8, wherein the thickened milk liquid is subsequently dried to form a powder.

11. A process according to claim 10, wherein the powder is brought under one or both of nitrogen and carbon dioxide directly after drying.

12. A process according to claim 9, wherein before further homogenization and sterilization occur, standardization with one of water and solutions of phosphates occurs.

13. The process of claim 1, wherein said at least one stage of the evaporator comprises an evaporating region, the evaporator region comprising downpipes, a liquid collector located below the downpipes, and a liquid product flow pipe for receiving the liquid product from the liquid collector, wherein the fat fraction is added below the downpipes.

14. The process of claim 1, wherein said at least one stage of the evaporator comprises an evaporating region, the evaporator region comprising downpipes, a liquid collector located below the downpipes, and a liquid product flow pipe for receiving the liquid product from the liquid collector, wherein the fat fraction is added to the liquid product flow pipe.

15. The process of claim 13, wherein the fat fraction is added below the downpipes of a final stage of a multi-stage evaporator.

* * * * *

UNITED STATES PATENT AND TRADEMARK OFFICE
CERTIFICATE OF CORRECTION

PATENT NO.    : 5,518,751

DATED         : May 21, 1996

INVENTOR(S)   : Cor de Boer, Ellert Camminga, Cornelis Glas, and Rienk Weerstra

It is certified that an error appears in the above-identified patent and that said Letters Patent is hereby corrected as shown below:

In column 6, line 62, "form" should be --from--.

Signed and Sealed this

Sixth Day of August, 1996

Attest:

BRUCE LEHMAN

Attesting Officer    Commissioner of Patents and Trademarks